(12) United States Patent
Saparoff (10) Patent No.: US 9,003,010 B1
(45) Date of Patent: Apr. 7, 2015

(54) SCALABLE NETWORK MONITORING SYSTEM

(75) Inventor: Nicholas W. Saparoff, Franklin, MA (US)

(73) Assignee: Expo Service Assurance Inc., Chelmsford, MA (US)

( * ) Notice: Subject to any disclaimer, the term of this patent is extended or adjusted under 35 U.S.C. 154(b) by 924 days.

(21) Appl. No.: 12/129,914

(22) Filed: May 30, 2008

Related U.S. Application Data (60) Provisional application No. 60/940,838, filed on May 30, 2007.

(51) Int. Cl.
*G06F 15/173* (2006.01)
*G06F 21/50* (2013.01)

(52) U.S. Cl.
CPC .................................. *G06F 21/50* (2013.01)

(58) Field of Classification Search
USPC ......................................................... 709/224
See application file for complete search history.

(56) References Cited

U.S. PATENT DOCUMENTS

| | | | | |
|---|---|---|---|---|
| 6,744,780 | B1 * | 6/2004 | Gu et al. ........................ | 370/450 |
| 2003/0206620 | A1 * | 11/2003 | Taylor ........................... | 379/229 |
| 2003/0225876 | A1 * | 12/2003 | Oliver et al. ................... | 709/224 |
| 2005/0060360 | A1 * | 3/2005 | Doyle et al. ................... | 709/200 |
| 2005/0138164 | A1 * | 6/2005 | Burton et al. .................. | 709/224 |
| 2005/0235058 | A1 * | 10/2005 | Rackus et al. ................. | 709/224 |
| 2006/0004866 | A1 * | 1/2006 | Lawrence et al. ........... | 707/104.1 |
| 2006/0004878 | A1 * | 1/2006 | Lawrence et al. ............. | 707/200 |
| 2006/0168197 | A1 * | 7/2006 | Motoyama et al. ........... | 709/224 |
| 2007/0150581 | A1 * | 6/2007 | Banerjee et al. ............... | 709/224 |
| 2007/0168526 | A1 * | 7/2007 | Ueno ............................. | 709/228 |
| 2009/0198814 | A1 * | 8/2009 | Oono et al. .................... | 709/224 |

\* cited by examiner

*Primary Examiner* — Lynn Feild
*Assistant Examiner* — Natisha Cox
(74) *Attorney, Agent, or Firm* — Nelson Mullins Riley & Scarborough LLP; John S. Curran, Esq.

(57) ABSTRACT

A scaleable network monitoring system is discussed. The network monitoring system identifies network monitoring information for the network elements being monitored. By storing only a non-redundant subset of the identified network information in memory, the network monitoring system is able to monitor a much larger group of network elements than is possible with conventional monitoring systems which are burdened by memory constraints. The scaleable network monitoring system also employs a multi-threaded architecture that dynamically spawns an array of multi-technology monitoring sub-systems.

12 Claims, 6 Drawing Sheets

SCALABLE NETWORK MONITORING SYSTEM

RELATED APPLICATION

This application claims the benefit of a United States Provisional Application entitled "Scalable Network Monitoring System" filed on May 30, 2007, application No. 60/940,838.

FIELD OF THE INVENTION

The embodiments of the present invention relate generally to the monitoring of physical and logical elements of a computer network, and more specifically to the composition and use of a scalable monitoring system used to monitor network elements.

BACKGROUND

In order to monitor a physical or logical element on a network, a certain amount of information must be known about the element, including details about the location of the agent or device upon which the network element is located and information on how to access the agent or device. In addition, further information may be needed as to the specific groups of information to request and which instances of those groups to request. The groups of information may be separated into three categories: agents, access methods and type of device being monitored. In conventional monitoring systems, the three categories of information are included with a listing of the item being monitored by the network monitoring system.

BRIEF SUMMARY

Embodiments of the present invention provide a scaleable network monitoring system. The network monitoring system identifies network monitoring information for the network elements being monitored. By storing only a non-redundant subset of the identified network information in memory, the network monitoring system is able to monitor a much larger group of network elements than is possible with conventional monitoring systems which are burdened by memory constraints. The scaleable network monitoring system also employs a multi-threaded architecture that may dynamically spawn an array of multi-technology monitoring sub-systems. The subsystems may be dynamically spawned in the network monitoring system's host device(s) and the devices being monitored based on the configuration of the network monitoring system and the maximum possible load that can be placed on the available Network Interface Cards (NICs).

In one embodiment, a method for scalable network monitoring includes the step of providing a network monitoring facility. The network monitoring facility monitors multiple network elements that are communicating over a network and identifies a collection of network monitoring information for each of the network elements. The method also selectively stores in memory a non-redundant subset of the network monitoring information for the network elements.

In another embodiment, a system for scalable network monitoring includes a network monitoring facility that monitors a plurality of network elements that communicate over a network. The system also includes a collection of network monitoring information for each of the network elements being monitored that is identified by the network monitoring facility. The system additionally includes a non-redundant subset of the network monitoring information for the network elements that has been selectively stored in memory.

BRIEF DESCRIPTION OF THE DRAWINGS

The invention is pointed out with particularity in the appended claims. The embodiments of the present invention may be better understood by reference to the following description taken in conjunction with the accompanying drawings, in which:

DETAILED DESCRIPTION

Conventional network monitoring systems include information related to each item being monitored with a listing of the items being monitored. Unfortunately, this inclusion of the related information with the identified network element leads to a significant amount of unnecessary duplication of information. This duplication of information in the memory of the device hosting the conventional network monitoring systems leads to a practical constraint on the amount of network elements that can be monitored by a network monitoring system and prevents network monitoring and monitoring stations from scaling to monitor massive amounts of network elements.

The embodiments of the present invention provide a mechanism addressing this drawback of unnecessarily duplicated information that is performed by conventional monitoring systems. In contrast to conventional monitoring systems, embodiments of the present invention avoid the unnecessary duplicate recording of network monitoring information and also dynamically spawn monitoring tasks appropriate for the number of elements being monitored. As a result, the embodiments of the present invention are able to efficiently scale to monitor networks with a number of elements that are an order of magnitude larger than those previously able to be monitored by conventional network monitoring systems.

Figure 1:
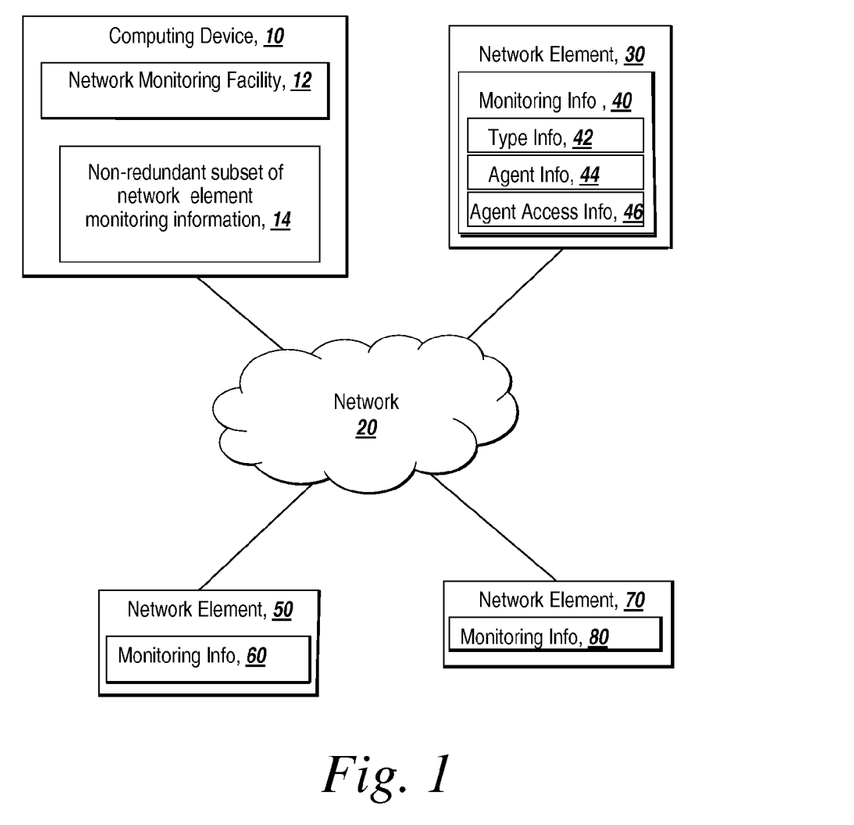
FIG. 1 depicts an environment suitable for practicing an embodiment of the present invention.

FIG. 1 depicts an environment suitable for practicing an embodiment of the present invention. A computing device 10 hosts a network monitoring facility 12. The network monitoring facility 12 is an executable software process or processes capable of monitoring large numbers of physical and/or logical network elements. The computing device 10 may be a PC, workstation, server, laptop, mainframe, PDA or other computing device equipped with a processor and capable of hosting the network monitoring facility 12 described herein. The computing device 10 is in communication over a network 20 with network elements 30, 50 and 70. It should be appreciated that the display of only three network elements is made for reasons of ease of illustration and that a deployed monitoring facility 12 of the present invention may monitor up to millions of network elements.

The network 20 may be an internet, the Internet, a Local Area Network (LAN), a Wide Area Network (WAN), a wireless network, an intranet, an extranet or some other type of network. Each network element 30, 50 or 70 includes or references network monitoring information 40, 60 or 80 which may be used by the network monitoring facility 12 to monitor the condition and status of the network elements. The network monitoring information may include type information 42 about the type of network element, agent information 44 about an agent or agents associated with and used to communicate with the network element, and agent access information 46 about the methods used to access the agent. It will be appreciated that additional types of information associated with monitoring the network element may also be provided. It should also be recognized that the arrangement of system components depicted in FIG. 1 is meant as an illustrative example of one of many possible environments suitable for practicing the embodiments of the present invention.

Figure 2:
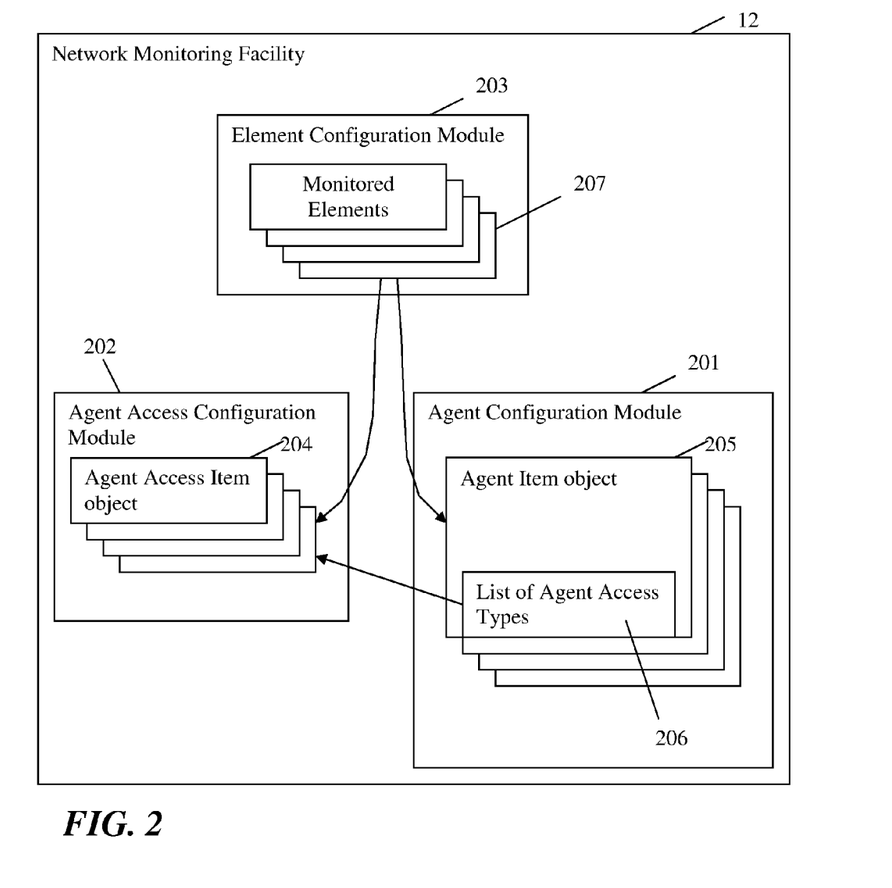
FIG. 2 depicts a block diagram of an exemplary network monitoring facility employed by an embodiment of the present invention.

FIG. 2 depicts the exemplary network monitoring facility 12 in greater detail. The exemplary network monitoring facility 12 includes an agent configuration module 201, an agent access configuration module 202 and an element configuration module 203 respectively holding agent information, agent access methods and element information for network elements being monitored. The agent configuration module 201 may hold basic information relating to the agents and/or devices that are being monitored (e.g. IP Address). The agent access configuration module 202 may hold more specific information about how that agent is accessed (e.g. instructions to use the SNMP protocol at UDP port 161 with community string "public", or connect to TCP port 1152 with username "mysql" and password "mysql"). The element configuration module 203 may hold unique information that pertains to each of the elements being monitored and that is not described in either the agent configuration module 201 or the agent access configuration module 202.

The network monitoring information that is stored in the agent configuration module 201, agent access configuration module 202 and element configuration module 203 may be received by the network monitoring facility 12 in multiple ways. For example, the network monitoring facility 12 may read a file, listen for updates on a TCP port, or connect to a database to identify network monitoring information necessary to monitor a network element. As the network monitoring facility 12 identifies and receives network monitoring information it may update the agent configuration module 201 by adding, removing, or updating an agent item object 205 in the agent configuration module. An agent item object 205 is an object that contains basic information about the agent such as addressing information (IP address, hostname, location, etc), statistics on availability and reachability, protocol based timeouts, and may contain a set of references to agent access item objects 204.

The network monitoring facility 12 may also update the agent access configuration module 202 by adding, removing, or updating an agent access item object 204. An agent access item object may include a set of information describing how to access the agent including but not limited to the network protocol and/or ports to use, and any specific access information like community strings, usernames, passwords, etc. References to agent item objects 205 may be stored in agent configuration module 201 in a list or other data structure. The agent access configuration module 202 may also contain a list or other data structure referencing agent access item objects 204. Each agent item object 205 can optionally include a list 206 of agent access types that are references to agent access item objects 204. Multiple agent item objects 205 may include references to the same Agent Access Item object 204 if the access methods are the same.

The element configuration module 203 may include a monitored elements list 207. The network monitoring facility 12 may add, remove, or update the monitored elements list 207 in the element configuration module 203. When the network monitoring facility 12 adds, removes or updates the monitored elements list 207, each element being monitored is assigned to an agent item object 205 and an Agent Access Item object 204. If a monitored element references an Agent that has not been defined in the agent configuration module 201 or an Access method that has not been defined in the agent access configuration module 202, a new agent item Object 205 or Agent Access Item 204 will be created and added to their respective configuration modules.

Figure 3:
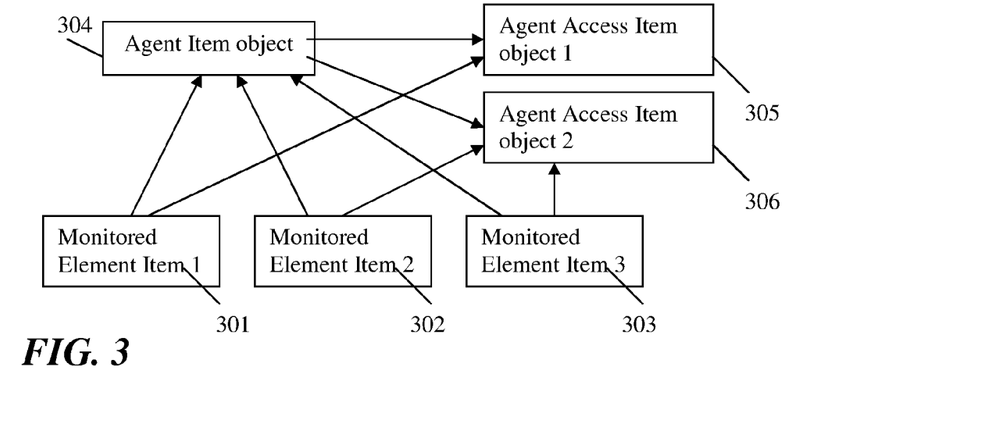
FIG. 3 depicts a block diagram of an exemplary referencing system employed by an embodiment of the present invention to store only a selective subset of the identified network monitoring information.

The interrelationship between the monitored elements 207, agent item objects 205 and agent access item objects 206 is depicted in FIG. 3. As can be seen in FIG. 3, multiple Monitored Element Items 301, 302 and 303 can point to the same agent item object 304 and Agent Access Item object 306. Similarly, an agent item object 304 can point to multiple Agent Access Item objects 305 and 306. As an example, Monitored Element Item 1 (301) points at the agent item object 304 and the Agent Access Item object 1 (305). Monitored Element Item 2 (302), points at the agent item object 304 and the Agent Access Item object 2 (306). Monitored Element Item 3 (303) points at the agent item object 304 and the Agent Access Item object 2 (306). Since all monitored element Items 301, 302 and 303 point at agent item object 304, it can be inferred, by the agent configuration module 201 or other process in the network monitoring facility 12, that agent item object 304 could point to both Agent Access Item object 1 (305), and Agent Access Item object 2 (306). As a result, the network monitoring facility 12 only needs store one copy of this object in the agent configuration module 201 and each Monitored Element Item only needs one reference to the same object.

The non-duplicative storage of monitoring information provides a significant memory savings. The storage of a single object may take up a considerable amount of memory, but a reference to the object takes up only the memory needed to store the reference (e.g. 4 bytes). It is this sharing of information through references to similar objects that allows the network monitoring facility 12 to save enormous amounts of space in the random access memory (RAM) on the computing device 10 that hosts the network monitoring facility. The saving of space in the RAM allows the storage of configuration information for literally millions of monitored elements. The network monitoring facility 12 is not forced to read all the available monitoring information as it is needed from a database because of the efficient storage of configuration and access information used in RAM. Likewise, if database storage is needed, the network monitoring facility 12 can also store this information in the database. For example, in one embodiment, a table for agents, a table for unique access methods, and another table for monitored element items may be used. Each row in the monitored element item table may have at least one column that refers to a row in the agents table, and one column that would refer to a row in the agent access methods table. A network monitoring facility 12 can also store this information on disk in a file, using a section to define agents, a section to define access methods, and another section to define monitored elements, each of which have a reference to an agent and an access method.

The network monitoring facility 12 is also able to prevent contention for the same hardware or software resources. The contention is dealt with on three levels—resources within the software application, the resources of the agents being monitored, and the resources of the machine on which the application is running. To remove contention for resources within the software, the network monitoring facility 12 uses a set of managers and resource pools. These "managers" can check for an idle resource, and, if one is available, provision the idle resource. An idle resource may be a polling engine, results collector, output engine, network interface card, etc. Each resource has a concept of "state". An idle resource is provisioned by changing the state of the resource to a state other than "idle" (i.e. initializing, ready, or busy), and passing a reference to the resource back to the requestor. In the event there are no idle resources, a new resource is added to a resource pool and a task is assigned to the new resource.

Figure 4:
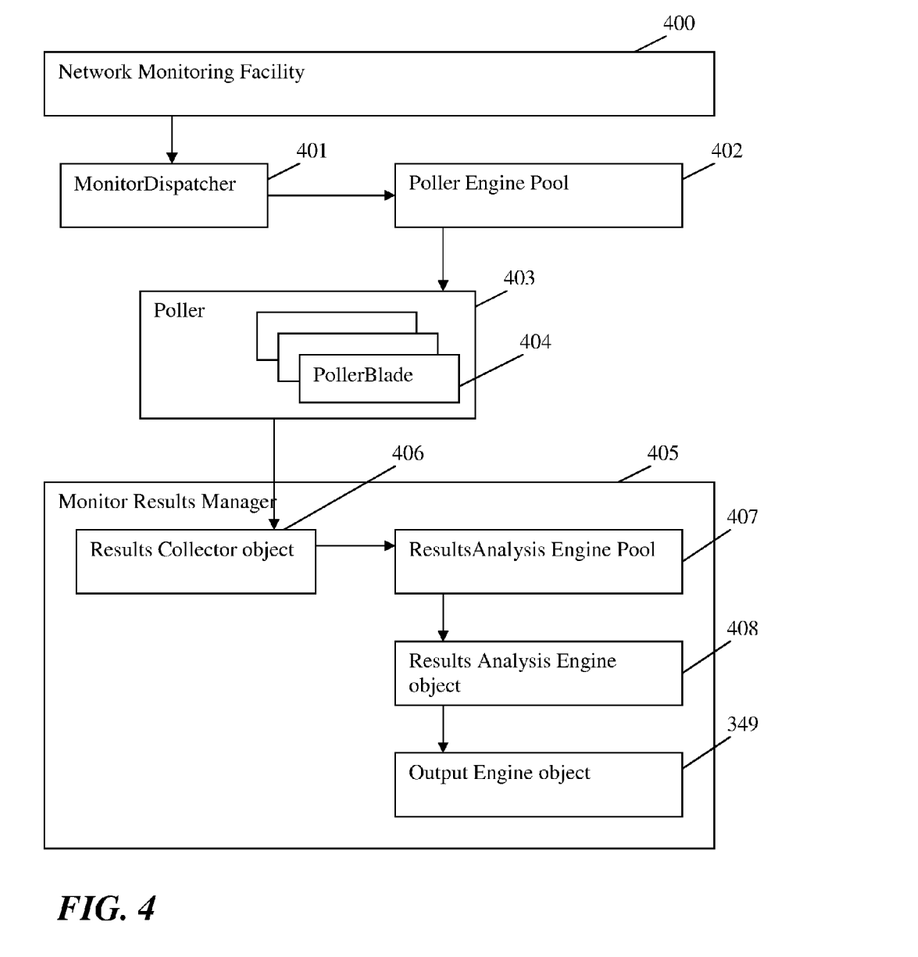
FIG. 4 depicts a block diagram showing the use of managers and resource pools by an embodiment of the present invention.

The use of the resource pool in dynamically allocating resources to perform network monitoring is depicted in FIG. 4. In one embodiment depicted in FIG. 4, the network monitoring facility 400 launches a scheduled task, referred to herein for illustrative purposes as a MonitorDispatcher task 401. The MonitorDispatcher task 401 determines which Monitored Elements 207 should be monitored based on the current state of the element and the last poll time, and then makes one or more requests to a Poller Engine Pool 402 for one or more Poller resources 403. A poller resource 403 is a process that iterates through the monitored elements and, using technology-specific poller blades 404, makes the queries over the network. The poller blades 404 are object resources that are created and used by the poller object. Each poller blade uses a specific technology for data acquisition. One can be SNMP, another XML/SOAP, another FTP, another may use TCP connects, etc. The poller blades 404 are used by the poller 403 when there are monitors that need data collected using that specific technology. Otherwise, they are idle and kept in a resource pool. In one embodiment of the present invention, the Poller Blades 404 may perform the actual access and collection of data while the Poller 403 is actually just another "manager". This represents a departure from conventional systems where the poller 403 would do the actual collection of data, and would not be capable of provisioning other pollers or querying agents in different ways (i.e. using different protocols and access methods).

The amount of poller resources spawned to perform network monitoring is determined based on a number of factors including the number of elements to be monitored, tuning information that may have been specified in the original startup configuration of the network monitoring facility 12, and the response times from the agents being polled. If there is static information in the startup configuration concerning the default number of blades per poller, the default number of pollers per pool, and/or which network interface cards can be used for monitoring, that information may be used as a base configuration for tuning poller resources. In addition, if the system so determines that the network is not responding quickly enough to monitor the number of elements in the configuration, and there is a large backlog of requests, the number of pollers may be dynamically increased and the requests more evenly spread out among those pollers and any available network cards in order to increase the overall bandwidth of the monitoring process. The system may also automatically determine if any one network card is overloaded with traffic, and if so, may round-robin requests with other network cards that are not as busy. Additionally, the system may also manage resources for slow responders by interleaving those requests with faster responders, thereby eliminating the possibility for any one particular device to cause a bottleneck in the polling process.

The poller resource 403 may be assigned a specified time window to query all the elements and send the results to the Monitor Results Manager 405. The MonitorDispatcher task 401 may then dispatch some or all of its' scheduled monitored elements 207 to the provisioned Pollers 403. Once provisioned, a Poller 403 may inform a Monitor Results Manager 405 that it needs a Results Collector object 406. The Monitor Results Manager 405 may create a new Results Collector object 406 and assign it to the Poller 403. The Poller resource 403 may then determines what type of Poller Blade 404 should be provisioned according to the number of Monitored Elements 207 and access the types of Agent Access Item objects 204 to which the Monitored Elements refer.

Once results are collected by the Results Collector object 406, the Monitor Results Manager 405 communicates with a Results Analysis Engine Pool 407 and retrieves an idle or new Results Analysis Engine object 408. The Results Analysis Engine object 408 processes the collected results and then creates a new Output Engine object 409, which outputs the results in a desired format. The output may be directed to a disk, to a database, to a screen, etc. Once each "manager" finishes its' portion of the task, it is returned to the pool from whence it came. The Results Analysis Engine object 408 is returned to the Results Analysis Engine Pool 407, and the Poller 403, is returned to the Poller Engine Pool 402.

The network elements can be polled by several different types of technologies and protocols (e.g. using SNMP, XML, FTP, ICMP, POP3, TCP connect, etc). An example of polling with SNMP would be querying an agent for the objects sysUpTime, ifOperStatus, ifInOctets, IfSpeed. Using the results from these objects one can determine the amount of time the network element has been available, its' current status, and the bandwidth utilization of the interface. The object ifInOctets is represented by the Object Identifier (OID) 1.3.6.1.2.1.2.2.1.10. To poll this object for interface 1 a poller using SNMP may send a SNMPGET query with the OID 1.3.6.1.2.1.2.2.1.10.1. The returned result is a large 32-bit integer. The value returned may be stored by the network monitoring facility 12 and the difference between the values on the current poll and the last poll may be used for analysis.

If it is determined that a monitored agent is not responding in an adequate time period, the network monitoring facility may slow down the requests to that particular agent and interleave requests to the slower agent with those to faster responding agents. In this way the overall monitoring process is not slowed down and a large number of network elements can still be monitored in the allotted time frame. Additionally, when the configuration on monitored elements continues to grow, the network monitoring facility can continue to dynamically spawn additional poller resources 403, each of which itself can then expand the number of thread resources being used. The network monitoring facility can continue to spawn additional pollers, based on the number of total available threads the computing device supporting the monitoring facility can handle. The dynamic decision as to the number of threads which the network monitoring facility can utilize in spawning additional polling resources is based on comparing the number of threads supportable by the number of CPUs (and cores in those CPUs) for the computing device compared with the number of threads being currently utilized.

Figure 5:
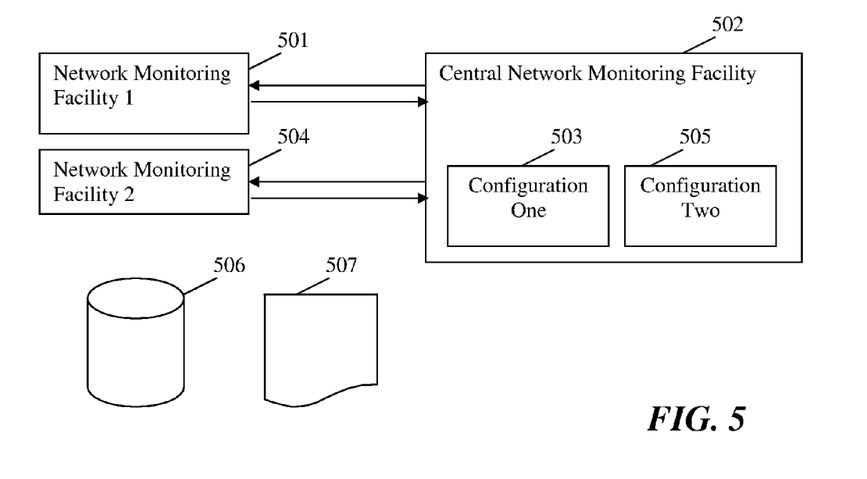
FIG. 5 depicts a block diagram showing the ability of an embodiment of the present invention to scale across multiple devices.

When a network monitoring facility needs to scale to monitor larger numbers of network elements, it may start to contend for resources on the computing device upon which it is running. To address this issue, the network monitoring facility is capable of scaling across multiple machines. For example, while the network monitoring facility may function as a stand-alone process it is also capable of communicating with other systems being provisioned by a central network monitoring facility such as the central network monitoring facility depicted in FIG. 5. A first monitoring facility 501 can be told by a central network monitoring facility 502, that it needs to monitor a certain configuration of network elements 503. Another network monitoring facility 504 can be told by the same central network monitoring facility 502 that it needs to monitor a certain configuration of network elements 505. Each network monitoring facility is assigned an identification number at startup, and polls network elements from the central configuration based on this unique identification number. Once the network monitoring facilities 501 and 504 are finished with their poll cycles, they can output the results to some type of storage like a database 506 or files on disk 507. Alternatively, the results may be streamed directly back to the central network monitoring facility 502. The embodiments of the present invention thus allow a number of network monitoring facilities to be running locally on a network or in a distributed fashion over a geographic and/or logical area, all monitoring their own subset of the entire network monitoring configuration.

Figure 6:
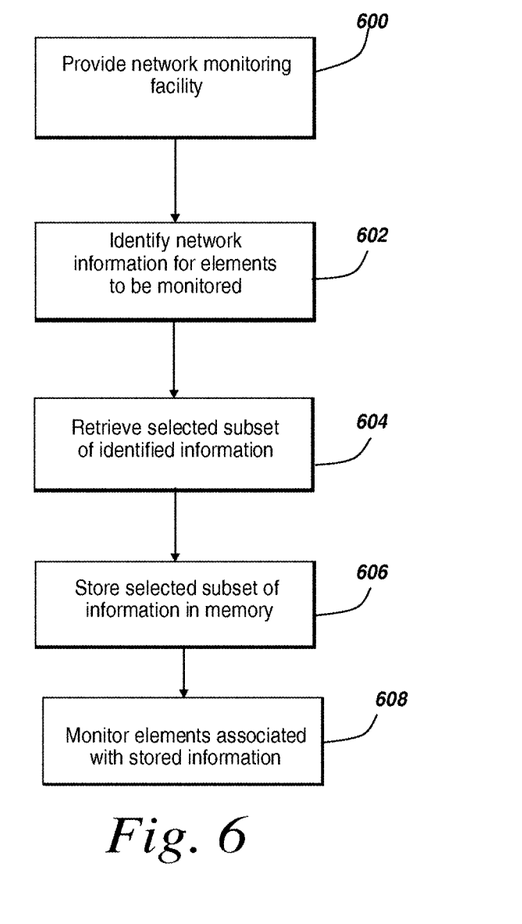
FIG. 6 is a flowchart of an exemplary sequence of steps that may be followed by an embodiment of the present invention to provide a scaleable network monitoring system.

FIG. 6 is a flowchart of an exemplary sequence of steps that may be followed by an embodiment of the present invention to provide a scaleable network monitoring system. The sequence begins with the providing of a network monitoring facility (step 600). The network monitoring facility identifies network information for network elements that are to be monitored (step 602). A selected subset of the available network monitoring information is retrieved (step 604) and stored in memory (step 606). The ability of the network monitoring facility to function and only store a subset of the available network monitoring information in memory enables the scaling of the network monitoring facility to track extremely large numbers of network elements. Once the network monitoring information has been stored, the network monitoring facility monitors the associated network elements (step 608).

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include FORTRAN, C, C++, C#, or JAVA. The software programs may be stored on or in one or more mediums as object code. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. For example, throughout the description herein, reference has been made to named types of objects. It should be appreciated that the naming of the types of objects is done for convenience in explaining the present invention to the reader and that objects with similar functionality but different names are also to be considered within the scope of the present invention. Similarly, practitioners of the art will realize that the sequence of steps and architectures depicted in the figures may be altered without departing from the scope of the present invention and that the illustrations contained herein are singular examples of a multitude of possible depictions of the present invention.

I claim:

1. A non-transitory physical medium holding computer-executable instructions for scalable network monitoring that when executed cause at least one computing device to:
   provide a network monitoring facility that includes a plurality of monitoring resources, the network monitoring facility monitoring a plurality of network elements communicating over a network with the plurality of monitoring resources, at least one of the plurality of monitoring resources dynamically spawning additional monitoring resources based on a response time of at least one network element in responding to a request initiated by the network monitoring facility;
   dynamically adjust a pattern of monitoring requests based on a response time of at least one network element in responding to a request initiated by the network monitoring facility, the adjusting interleaving a request to a slower responding network element with requests to faster responding network elements;
   identify a collection of network monitoring information for each of the plurality of network elements with the network monitoring facility, the identified network monitoring information being configuration and access information for the plurality of network elements and for agents associated with at least one of the plurality of network elements; and
   programmatically store in memory a non-redundant subset of the collection of network monitoring information for the plurality of network elements.

2. The medium of claim 1 wherein an amount of resources spawned is based on a number of Network Interface Cards (NICs) available for use in performing the monitoring of the plurality of network elements.

3. The medium of claim 1 wherein an amount of resources spawned is based on a number of threads available on a computing device supporting the monitoring facility.

4. The medium of claim 1 wherein the dynamically spawned resources represent a plurality of technology-specific resources.

5. The medium of claim 1 wherein the network monitoring facility is one of a plurality of network monitoring facilities contributing to a central repository of network information.

6. A computing device-based system for scalable network monitoring, the computing-device based system comprising:
   a network monitoring facility that includes a plurality of monitoring resources executing on the computing device, the network monitoring facility monitoring a plurality of network elements communicating over a network with the plurality of monitoring resources, at least one of the plurality of monitoring resources dynamically spawning additional monitoring resources based on a response time of at least one network element in responding to a request initiated by the network monitoring facility, the network monitoring facility identifying a collection of network monitoring information for each of the plurality of network elements, the collection of network monitoring information being configuration and access information for the plurality of network elements and for agents associated with at least one of the plurality of network elements; and
   a memory storing a non-redundant subset of the network monitoring information for the plurality of network elements, wherein the network monitoring facility dynamically adjusts a pattern of monitoring requests based on a response time of at least one network element in responding to a request initiated by the network monitoring facility, the adjusting interleaving a request to a slower responding network element with requests to faster responding network elements.

7. The system of claim 6 wherein
a plurality of technology-specific resources are dynamically spawned for use in performing the monitoring of the plurality of network elements.

8. A computer-implemented method for performing scalable network monitoring, comprising:
providing a network monitoring facility that includes a plurality of monitoring resources and is hosted on a computing device, the network monitoring facility monitoring a plurality of network elements communicating over a network with the plurality of monitoring resources, at least one of the plurality of monitoring resources dynamically spawning additional monitoring resources based on a response time of at least one network element in responding to a request initiated by the network monitoring facility;
dynamically adjusting a pattern of monitoring requests based on a response time of at least one network element in responding to a request initiated by the network monitoring facility, the adjusting interleaving a request to a slower responding network element with requests to faster responding network elements;
identifying a collection of network monitoring information for each of the plurality of network elements with the network monitoring facility, the identified network monitoring information being configuration and access information for the plurality of network elements and for agents associated with at least one of the plurality of network elements; and
programmatically storing in memory a non-redundant subset of the collection of network monitoring information for the plurality of network elements.

9. The method of claim 8 wherein an amount of resources spawned is based on a number of Network Interface Cards (NICs) available for use in performing the monitoring of the plurality of network elements.

10. The method of claim 8 wherein an amount of resources spawned is based on a number of threads available on a computing device supporting the monitoring facility.

11. The method of claim 8 wherein the dynamically spawned resources represent a plurality of technology-specific resources.

12. The method of claim 8 wherein the network monitoring facility is one of a plurality of network monitoring facilities contributing to a central repository of network information.

\* \* \* \* \*